(12) United States Patent
Cross (10) Patent No.: US 8,466,668 B2
(45) Date of Patent: Jun. 18, 2013

(54) TRANSIENT DIFFERENTIAL SWITCHING REGULATOR

(75) Inventor: David Anthony Cross, Beds (GB)

(73) Assignee: Pulse Electronics (Avionics) Limited (GB)

( * ) Notice: Subject to any disclaimer, the term of this patent is extended or adjusted under 35 U.S.C. 154(b) by 342 days.

(21) Appl. No.: 12/843,600

(22) Filed: Jul. 26, 2010

(65) Prior Publication Data

US 2011/0025281 A1 Feb. 3, 2011

(30) Foreign Application Priority Data

Jul. 30, 2009 (GB) .................................. 0913280.4

(51) Int. Cl.
*G05F 1/40* (2006.01)

(52) U.S. Cl.
USPC ........................................................ 323/282

(58) Field of Classification Search
USPC .......................................... 323/282–285, 351
See application file for complete search history.

(56) References Cited

U.S. PATENT DOCUMENTS

| | | | |
|---|---|---|---|
| 3,758,840 A * | 9/1973 | Oliver .............................. 363/15 |
| 4,024,437 A | 5/1977 | Suzuki | |
| 4,428,016 A * | 1/1984 | Brasfield ......................... 361/18 |
| 4,769,752 A | 9/1988 | Rackowe | |
| 4,811,184 A | 3/1989 | Koninsky et al. | |
| 5,070,294 A * | 12/1991 | Nochi ........................... 323/267 |
| 5,161,073 A * | 11/1992 | Gami et al. ................. 360/73.03 |
| 5,499,154 A | 3/1996 | Cullison | |
| 5,615,097 A | 3/1997 | Cross | |
| 5,617,013 A * | 4/1997 | Cozzi ............................. 323/222 |
| 5,714,863 A * | 2/1998 | Hwang et al. ................. 320/166 |
| 5,932,995 A * | 8/1999 | Wagoner ....................... 323/222 |
| 6,118,228 A * | 9/2000 | Pal ................................. 315/307 |
| 6,154,380 A * | 11/2000 | Assow et al. ................... 363/61 |
| 6,462,524 B1 * | 10/2002 | Maniktala ...................... 323/282 |
| 7,030,596 B1 * | 4/2006 | Salerno et al. ................. 323/282 |
| 7,391,132 B2 * | 6/2008 | Chen ............................. 307/43 |
| 7,501,913 B2 * | 3/2009 | Hanada et al. ................ 333/132 |
| 7,847,622 B2 * | 12/2010 | Kawasaki ...................... 327/540 |
| 8,013,474 B2 * | 9/2011 | Besser et al. .................. 307/99 |
| 8,130,524 B2 * | 3/2012 | Lee et al. ....................... 363/132 |
| 8,159,138 B2 * | 4/2012 | Chen et al. ................. 315/169.1 |
| 8,207,711 B2 * | 6/2012 | Crawford et al. ............. 323/207 |

(Continued)

FOREIGN PATENT DOCUMENTS

| GB | 1521328 | 8/1978 |
|---|---|---|
| GB | 0913280.4 | 1/2011 |
| GB | 0913280.4 | 10/2011 |

*Primary Examiner* — Adolf Berhane
(74) *Attorney, Agent, or Firm* — Wells St. John P.S.

(57) ABSTRACT

The present invention provides a transient differential switching regulator for a DC power supply. In one aspect, an output of the regulator is provided between a positive voltage line and a return line. A switching circuit switches the regulator between a normal mode, wherein the output voltage is controlled at a set-point voltage, and a current mode wherein the output current is controlled so as not to exceed a peak current limit. In one aspect, an output of the regulator is provided between a positive voltage line and a return line. A first inductance is disposed in the positive voltage line, and a second inductance is disposed in the return line. In another aspect a current detecting circuit is configured to perform dual functions of measuring the DC current so as to protect against an over-current condition arising during the normal operation mode and detecting high transient current conditions.

22 Claims, 7 Drawing Sheets

U.S. PATENT DOCUMENTS

| | | | |
|---|---|---|---|
| 8,222,885 B2 * | 7/2012 | Kirchmeier et al. | 323/350 |
| 8,233,297 B2 * | 7/2012 | Kim et al. | 363/65 |
| 2007/0252567 A1 | 11/2007 | Dearn et al. | |
| 2009/0140706 A1 * | 6/2009 | Taufik et al. | 323/272 |
| 2010/0109617 A1 | 5/2010 | Erdl | |
| 2011/0018515 A1 * | 1/2011 | McCloy-Stevens | 323/284 |

* cited by examiner

CONVENTIONAL SWITCHING REGULATOR
COMMON VIN- AND VOUT- TERMINALS

Fig. 1

TRANSIENT DIFFERENTIAL FILTER
SWITCHING REGULATOR

Fig. 2

Block Diagram of Filter and Transient Protection System Using The Transient Differential Filter Switching Regulator

Fig. 8

TRANSIENT DIFFERENTIAL SWITCHING REGULATOR

CROSS REFERENCE TO RELATED APPLICATION

This application is claims priority from U.K. Patent Application Serial No. 0913280.4 which was filed on Jul. 30, 2009 and which is incorporated herein by reference.

RELATED PATENT DATA

1. Field of the Invention

The present invention relates to a transient differential switching regulator for a power supply circuit.

2. Background

Many electronic devices, particularly computing devices, require a regulated direct current (DC) power supply. DC to DC converters are employed to convert unregulated DC power supplies to the required regulated supply. The unregulated DC supply may be provided from a mains AC supply by means of a rectifier. For example, a switched-mode power supply (SMPS) is an electronic power supply unit that incorporates a switching regulator. The SMPS switches a power transistor between saturation (full on) and cutoff (completely off) with a variable duty cycle whose average is the desired output voltage. It switches at a much-higher frequency (tens to hundreds of kHz) than that of the AC mains line (typically 50 or 60 Hz). Control of the voltage is obtained using pulse width modulation (PWM) circuits, which are available in the form of integrated circuit chips.

However there are transient conditions that arise during power-up of devices, or as a result of transients in the AC supply, that can give rise to very high transient voltages or currents. If these high voltages or currents are applied to the input of the DC to DC converter, then either the converter itself will be damaged, or the transient high current/voltage will be supplied to the electronic device which will be damaged. For this reason transient input protection circuits are used between the unregulated DC supply and the DC to DC converter.

U.S. Pat. No. 5,615,097 describes a transient over-voltage protection circuit that uses a current detection means and an over-voltage detection means. The over-voltage detection means provides protection against high transient over-voltages while the current detection means limits the total current through the device. This circuit relies on the charging and discharging of a capacitor to provide a hysteresis effect in controlling the input voltage to the DC to DC converter between upper and lower levels. In many instances such hysteresis in the input voltage is undesirable, and it is preferable to use a more precise control of the voltage at a set-point value.

Also high transient currents may arise during initialisation of the power supply when capacitors are being charged and instantaneous voltages are at their highest. Where the voltage is controlled using high frequency PWM, the pulses are of very short duration, and in these circumstances the high transient currents are difficult to measure using conventional current detection methods (e.g. based on shunt resistors).

Moreover, high frequency switching leads to the generation of high amplitude, high frequency energy, so that any such regulator should also include suitable filter circuitry to ensure electromagnetic compatibility (EMC)—i.e. to protect against the effects of electromagnetic interference (EMI). This places a further burden on the complexity and costs of these circuits.

The present invention has been conceived with the foregoing in mind.

SUMMARY OF THE INVENTION

According to the present invention there is provided a transient differential switching regulator for a DC power supply. An output of the regulator is provided between a positive voltage line and a return line. A switching circuit switches the regulator between a normal mode, wherein the output voltage is controlled at a set-point voltage, and a current mode wherein the output current is controlled so as not to exceed a peak current limit. A first inductance is disposed in the positive voltage line, and a second inductance is disposed in the return line.

It is an advantage that the circuit employs inductors in the both the positive and return lines, which inductors are used to smooth the controlled output current in the current mode, but also provide the inductance required for EMC filtering during the normal operating mode. This means that separate EMC filter circuitry is not required.

In embodiments of the invention, the switching circuit may comprise an integrated circuit operable to provide a voltage signal to switch one or more field effect transistors. In the normal mode the transistors are held on continuously and in the current mode the transistors are switched to control the output current. The regulator is preferably configured to operate in the current mode at initialisation of the regulator so that an output capacitance can be charged up to the normal input voltage level.

In embodiments of the invention, the regulator comprises a pulse-width modulated, (PWM) signal generator, whereby a pulsed signal is provided for switching the transistors when operating in the current mode. The PWM signal generator is preferably configured to provide a continuous duty ratio of 100% when the voltage set-point is achieved.

In embodiments of the invention, the regulator further comprises an over-voltage detection circuit operable to affect the voltage set-point input provided to the PWM signal generator. The over-voltage detection circuit may comprise an opto-coupler diode coupled to an opto-coupler switch.

In embodiments of the invention, the regulator further comprises a current detection circuit having a terminal for providing a signal to over-ride the voltage signal and switch off the field effect transistors on detection of an over-current. The current detection circuit is preferably configured to perform dual functions of measuring the DC current so as to protect against an over-current condition arising during the normal operation mode and detecting high transient current conditions. The current detection circuit may comprise a current-sensing transformer for detecting a high transient DC current. The current detection circuit may comprise a shunt resistor for detecting an over-current condition arising during the normal operation mode. An amplifier may be provided for amplifying the voltage across the shunt resistor and providing the amplified voltage signal as an input to the PWM generator to provide a pulse-width cycle-by-cycle control signal for the current mode.

It is an advantage that the use of a current transformer enables very short duration high current pulses to be detected, and to rapidly turn off the regulator before such high currents are transmitted to the output of the regulator.

In embodiments of the invention the switching circuit and the current detection circuit are provided in a low-voltage return line from the power supply. It is an advantage that these circuits operate at low voltage in the return line and are not subjected to the stresses of high voltages.

According to a second aspect of the present invention there is provided a transient differential switching regulator for a DC power supply. A switching circuit is provided for switching the regulator between a normal mode, wherein the output voltage is controlled at a set-point voltage, and a current mode wherein the output current is controlled so as not to exceed a peak current limit. A current detecting circuit is configured to perform dual functions of measuring the DC current so as to protect against an over-current condition arising during the normal operation mode and detecting high transient current conditions.

In embodiments of the invention a current-sensing transformer is provided for detecting a high transient DC current. Preferably the current detecting circuit is disposed in a low voltage return line of the regulator.

DETAILED DESCRIPTION OF PREFERRED EMBODIMENTS

Figure 1:
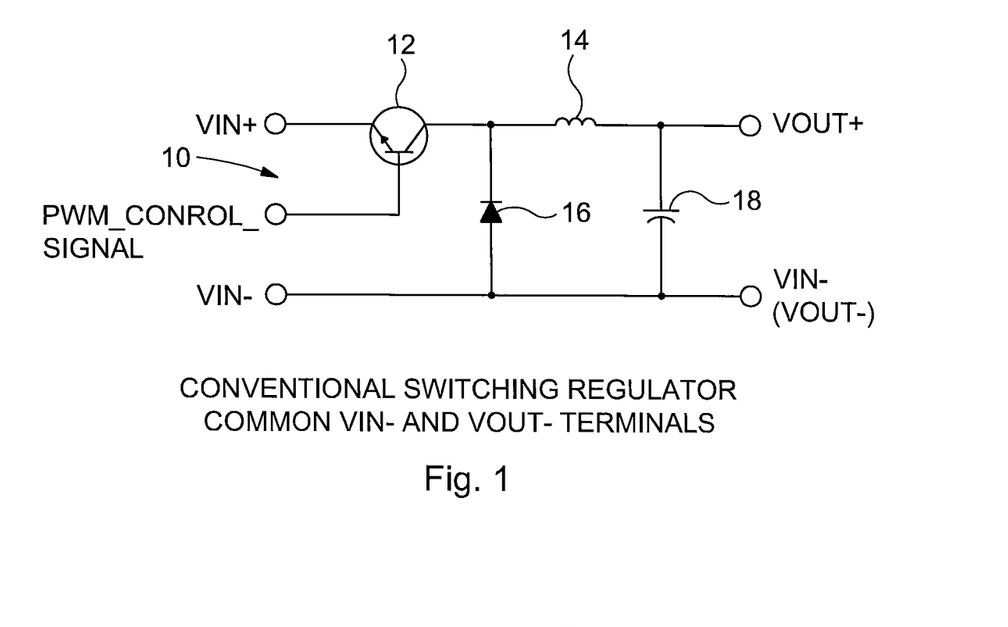
FIG. 1 is a circuit diagram illustrating a conventional switching regulator arrangement.

Referring to FIG. 1, a conventional switching regulator 10, as used for example with a SMPS, receives an unregulated DC input voltage across terminals VIN+ and VIN−, and supplies a regulated DC voltage at the terminals VOUT+ and VOUT−, VOUT− being at the same potential as VIN−. Connected into the positive line, between VIN+ and VOUT+ is a power transistor 12. The base of power transistor 12 is connected to a PWM control signal. An output signal conditioning circuit includes an inductor 14, diode 16 and electrolytic capacitor 18 between the emitter of the power transistor 12 and the output terminals VOUT+ and VOUT−. In operation the PWM control signal provides a high frequency pulse stream that switches the power transistor 12 between a saturation 'on' condition in which the transistor conducts so that current will flow from VIN+ to VOUT+, and a non-conducting 'off' condition. The PWM signal controls the voltage at a set point determined by the duty cycle of the pulses, whose average is the desired output voltage. The high frequency switching of the power diode 12 causes a high frequency ripple in the current, which is smoothed out by the inductor (or choke) 14.

Figure 2:
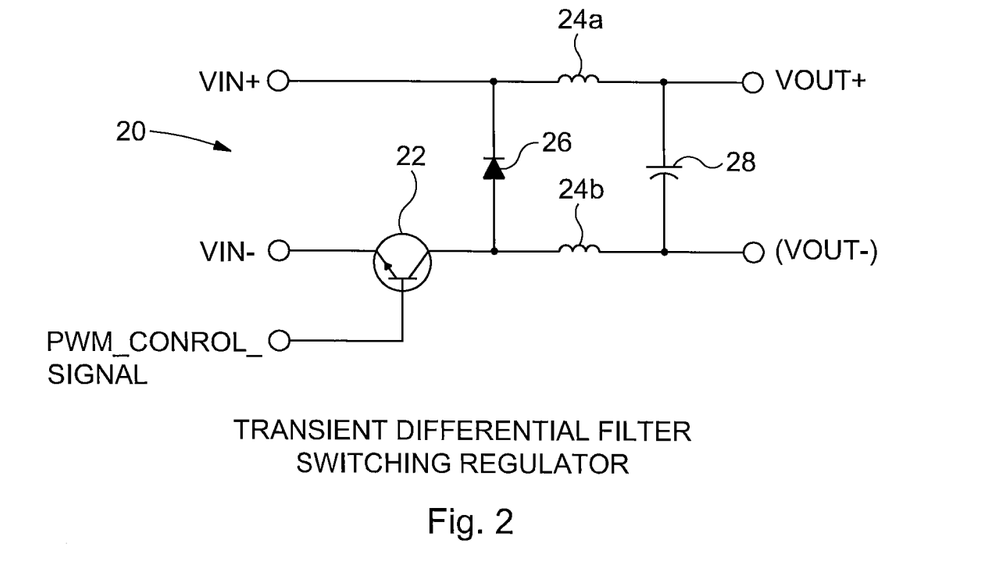
FIG. 2 is a circuit diagram illustrating an alternative arrangement of switching regulator for use as a transient differential filter switching regulator.

Referring to FIG. 2, there is shown a similar circuit 20 to the switching regulator circuit 10 shown in FIG. 1, except that power transistor 22 is located in the negative, or return line. The regulator circuit 20 includes an inductor 24a in the positive line and a further inductor 24b in the negative/return line and a diode 26. The inductors 24a, 24b act as chokes to smooth the current in both the positive and return lines. The combined inductance value of these two inductors is equivalent to that of the inductor 14 shown in FIG. 1. The inductors 24a, 24b also provide the required function of chokes for EMI filtering in both the positive line and the return line. Note that the use of an inductor in the positive line only would not provide any EMI reduction when EMI measurements are made for the return line. In that case further inductors external to the circuit under discussion would have to be inserted. The arrangement of FIG. 2 forms the basis of the transient differential switching regulator described in more detail below.

Figure 3:
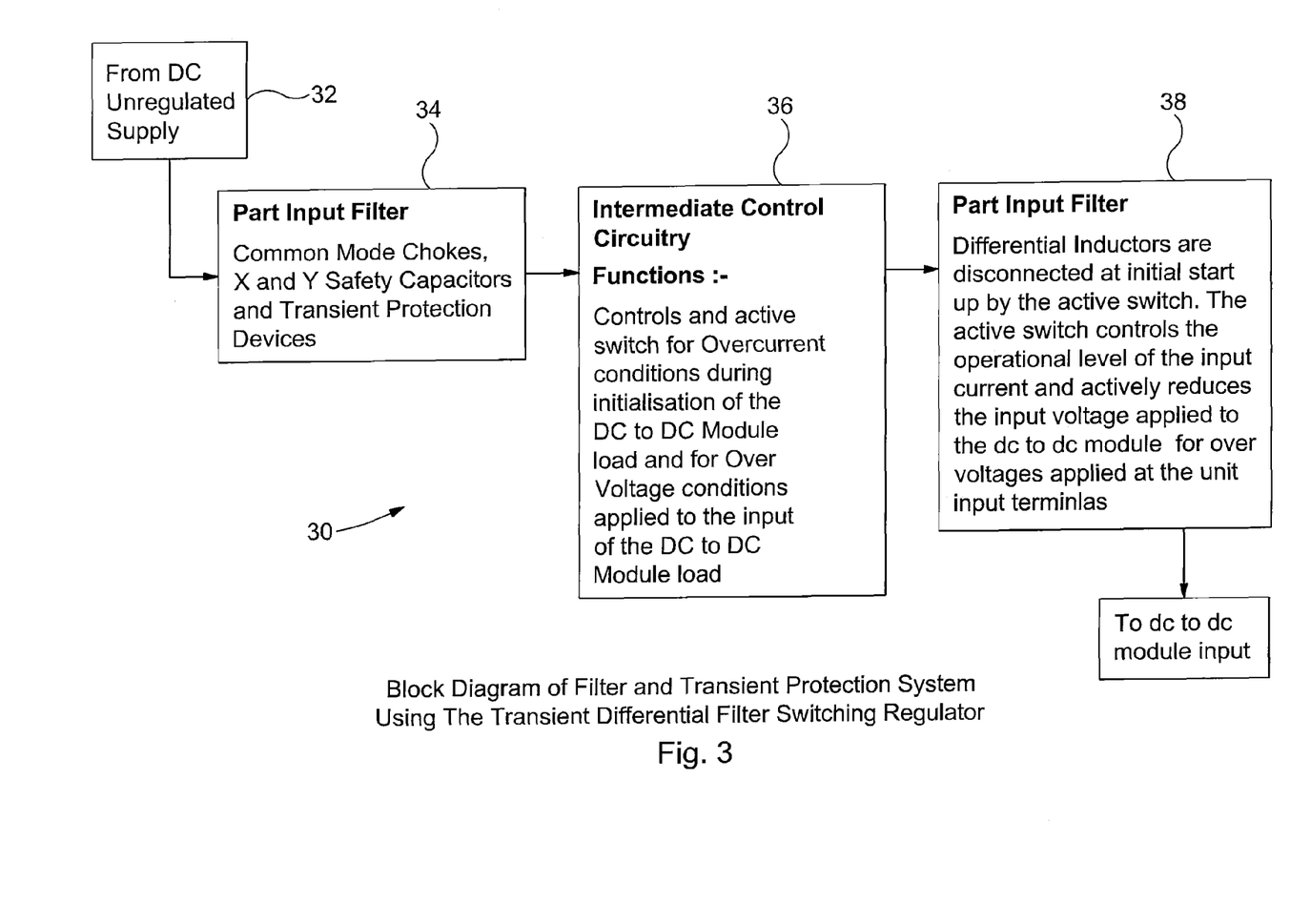
FIG. 3 is a block diagram illustrating the functional components of a transient differential filter switching regulator.

FIG. 3 shows the principal functional stages of a transient differential switching regulator 30. An unregulated DC supply 32 is provided to a first input filter part 34, which includes, for example, common mode chokes, an 'X' and 'Y' arrangement of capacitors and transient protection devices. The transient differential switching regulator 30 also includes control circuitry 36 with an active switch that provides protection against over-current and over-voltage conditions. A second input filter part 38 provides further conditioning and transient protection before the regulated DC voltage is supplied to the input of a DC to DC converter module. The second input filter part 38 will be referred to hereafter as an output filter circuit, although it will be appreciated that this relates to the output of the regulator, which is the input to the DC-to-DC converter. These functional aspects of the regulator will be described in more detail below with reference to the circuits shown in FIGS. 4 to 7.

Figure 4:
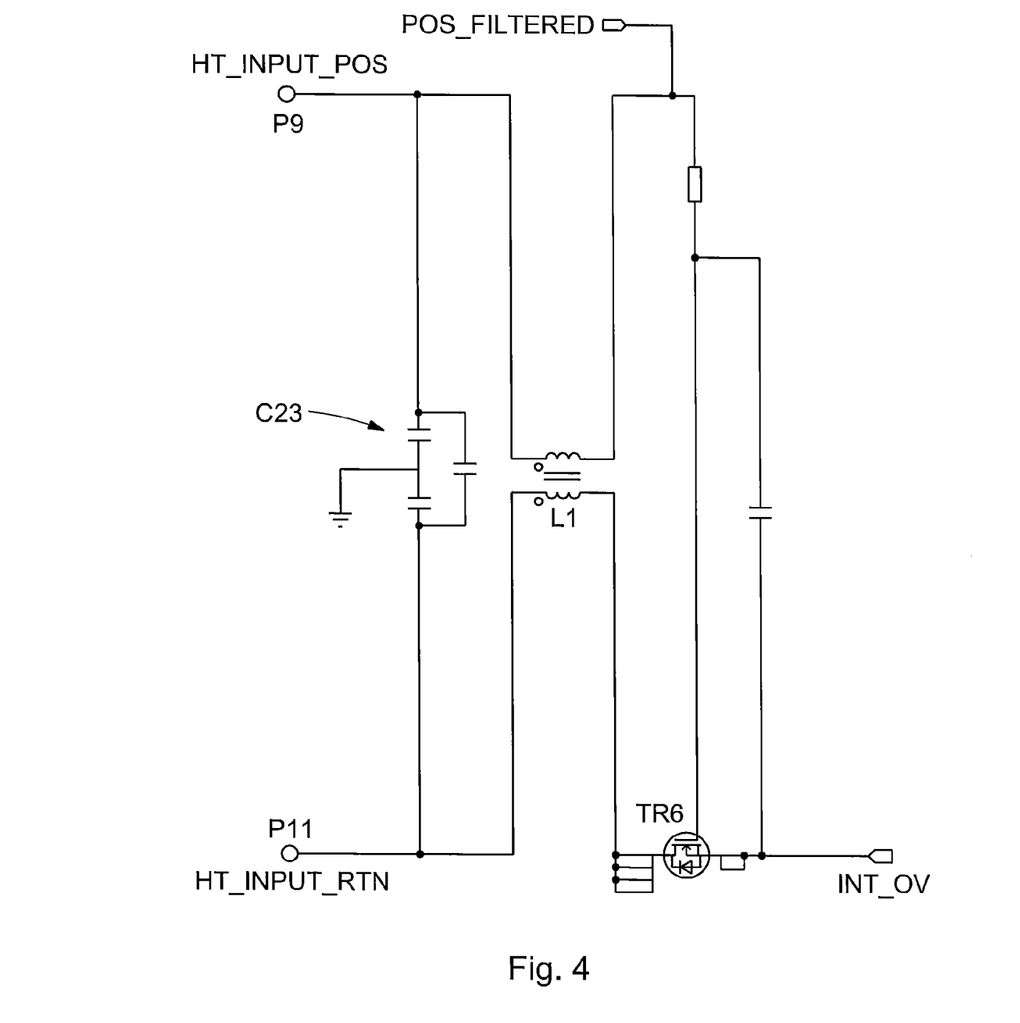
FIG. 4 is a circuit diagram of an input filter circuit forming part of the transient differential filter switching regulator of FIG. 3.

FIG. 4 shows a circuit diagram of the first input filter part 34 referred to above. The unregulated DC supply voltage is provided across the terminals P9 and P11 (referred to as HT_INPUT_POS and HT_INPUT_RTN respectively). An 'X' and 'Y' arrangement of capacitors C23 is provided across the terminals P9 and P11, and a common mode choke filter L1 is placed in series with the input terminals. These components provide the required EMC filtering function in a known manner. FIG. 4 shows a single stage 'X' and 'Y' capacitors C23 and common mode choke filter L1, although additional stages could be added if required. The output from L1 is provided to a field effect transistor switch TR6, which protects against a reverse polarity voltage applied across the input terminals P9, P11. The output of the first input filter circuit is a filtered DC voltage provided across the terminals labelled POS_FILTERED and INT_0V, which are connected to intermediate control circuitry 36 described below.

Figure 5:
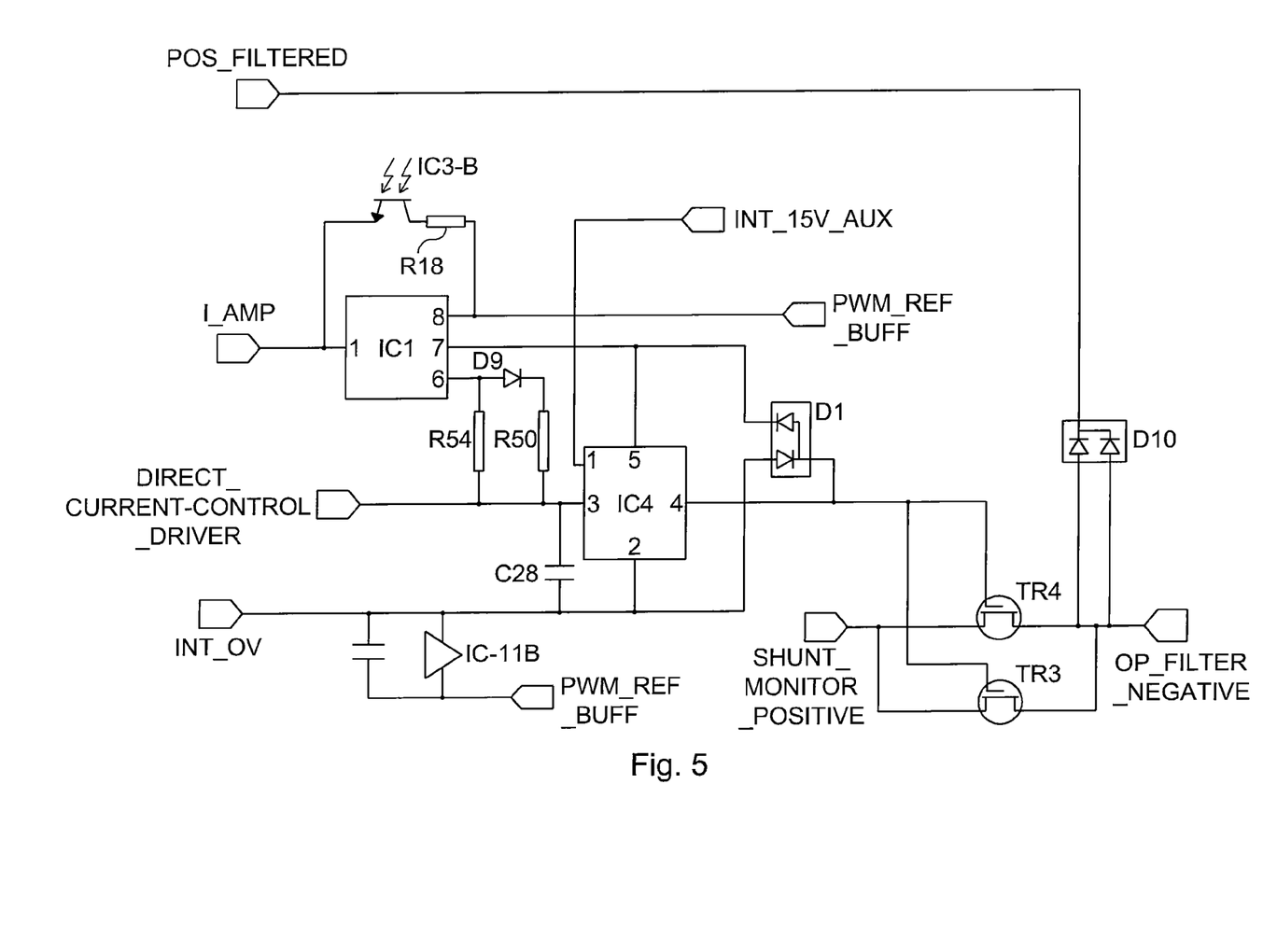
FIG. 5 is a circuit diagram of a switching circuit with power delay function forming part of the transient differential filter switching regulator of FIG. 3.

FIG. 5 shows the key components of an active switching circuit 50 forming part of the intermediate control circuitry 36 of FIG. 3. As described above with respect to FIG. 2, these regulator controls are provided in the DC return line between a terminal labelled OP_FILTER_NEGATIVE, and the INT_0V terminal. Active switching is provided by a pair of metal oxide semiconductor field effect transistors (MOSFETs) TR3 and TR4, between the OP_FILTER_NEGATIVE terminal and a SHUNT_MONITOR_POSITIVE terminal, which is an input to a current limiting circuit to be described later. The use of two MOSFETS TR3 and TR4 makes the circuit more robust than if a single MOSFET were used, but otherwise the number of MOSFETs has no relevance to the principles discussed here.

The switching circuit 50 includes two integrated circuits. Integrated circuit IC1 is a pulse-width modulation circuit that provides a pulse signal on pin 6 modulated in response to an input signal, I_AMP, on pin 1. I_AMP is the normal cycle by cycle voltage input proportional to peak input current. IC1 is configured as a PWM power supply with a high duty ratio up to 90%. IC4 is a power driver with an output on pin 4 responsive to an input signal at pin 3. Other features of the switching circuit 50 shown in FIG. 5 include: an opto-coupler switch IC3-B in series with a resistor R18, the functions of which will be described below; a DIRECT_CURRENT-CONTROL_DRIVER terminal connected to pin 3 of IC4; a PWM reference signal provided from the INT_0V return line via IC11-B to pin 8 of IC1; and diode pairs D1 and D10. D1 is provided for protection of IC4 to divert any output noise voltages, which may be generated when TR3 and TR4 are switched via their Drain Gate Capacitances, to the Capacitance C26 across IC4. The D10 diode pair performs the function of the power diodes 16, 26 of FIGS. 1 and 2. This provides the switching regulator functions, and in classical terms is referred to as being in the freewheeling position with current flowing in the diode when the switches TR4 and TR3 are off. Note that in a practical implementation of the circuit 50 various additional components such as capacitors across terminals/lines and in-line resistors would be included, but these have been omitted for clarity.

There are various modes of operation of the switching circuit 50.

In Normal Mode On, the MOSFETs TR3 and TR4 are held on continuously by the action of IC4, whose input on pin 3 is held high. This is the result of the action of a delay introduced by a diode D9, resistor R54 and capacitor C28 to the PWM output signal on pin 6 of IC1. IC1 provides a continuous duty ratio of 100% when the voltage set-point (provided from terminal I_AMP to pin 1 of IC1) is achieved. The voltage set-point provided via I_AMP is only affected by the action of the opto-coupler IC3-B during an over-voltage condition, as will be described in more detail below.

Current Mode Normal is a mode that occurs at initialisation of the regulator as any output capacitance is charged up to the normal input voltage level. At start-up up a large input voltage can be applied but there is initially a low or zero voltage on the capacitors connected to the outputs. While this capacitance is being charged up, the regulator is switched into this mode with a limited current control. The output current control allows the circuit to charge up the voltage on any output capacitance (e.g. see C3 in FIG. 7) until the input voltage is equal to the output voltage, at which point the PWM circuit ceases to operate and the switches TR3 and TR4 continuously conduct. This differentiates the Transient Differential Filter Switching Regulator from a conventional Switching Regulator, which does not have to consider PWM duty ratio operation at 100 percent. Note that the PWM duty ratio to satisfy the peak current limit must be greater than about 20% so that it is not affected by the delay associated with diode D9, resistor R54 and capacitor C28.

Current Mode Fast with No Delay is a mode that occurs when a signal is provided on the terminal DIRECT_CURRENT-CONTROL_DRIVER (from the current limit circuit to be described below) as an input to pin 3 of the current driver IC4. This provides a direct signal from pin 4 of IC4 to turn off the MOSFETs TR3 and TR4 with minimal delay, by overriding the delay associated with the diode D9, resistor R50 and capacitor C28 described above in the Normal Mode On. This mode therefore provides protection against high current conditions that can occur when there are large differential voltages between the unregulated input supply voltages and output capacitor voltages.

Figure 6:
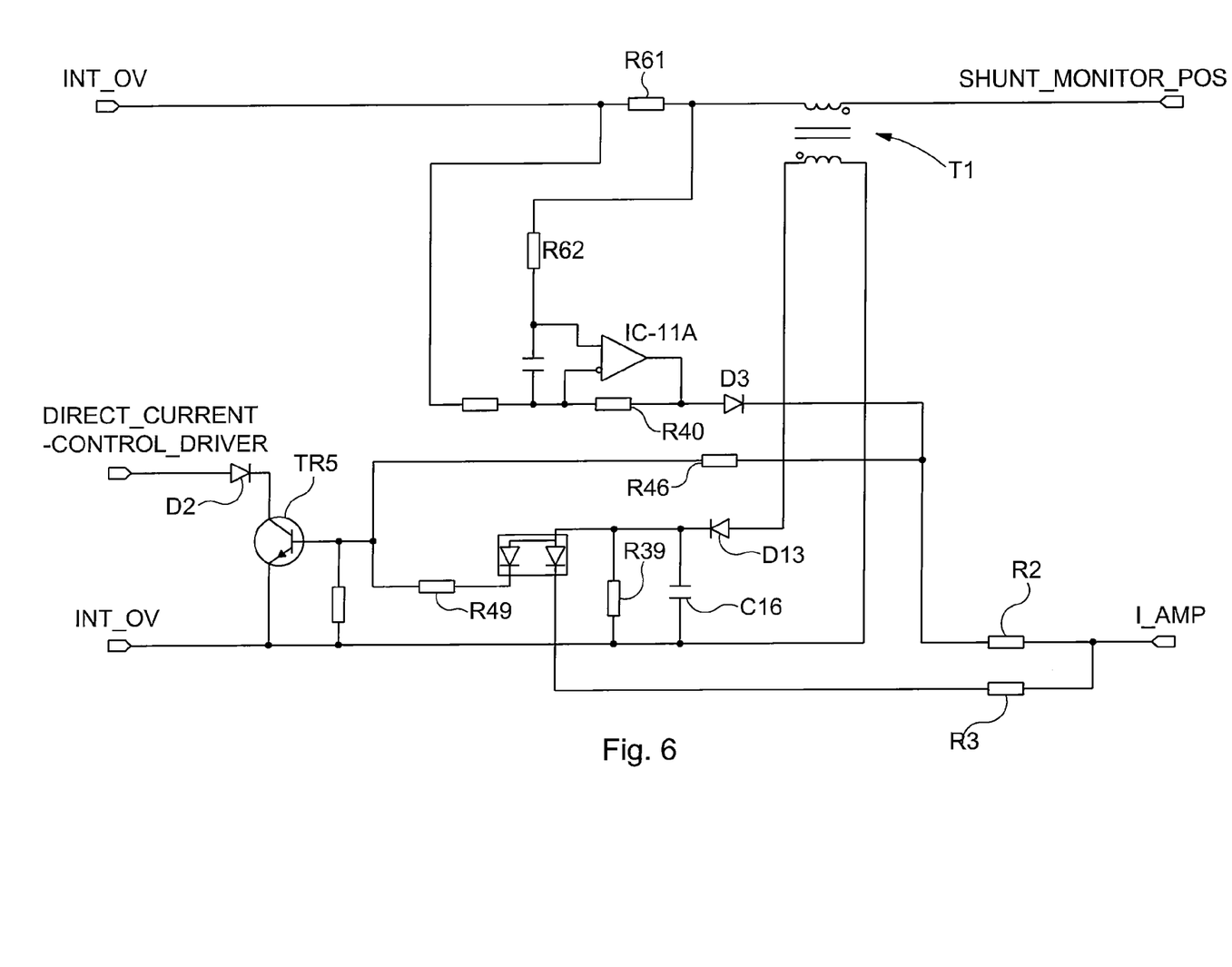
FIG. 6 is a circuit diagram of a current limit circuit forming part of the transient differential filter switching regulator of FIG. 3.

FIG. 6 illustrates a current limiting circuit 60 forming part of the intermediate control circuitry 36 of FIG. 3. This circuit is configured to perform a dual function of measuring the DC current so that action can be taken to protect against an over-current condition arising during normal operation of the power supply, as well as detecting high transient current conditions.

The current limiting circuit 60 includes a shunt resistor R61 and the primary windings of a current transformer T1 located in the low-voltage return line between the SHUNT_MONITOR_POS terminal (see FIG. 5) and the INT_0V terminal. The circuitry associated with these (see below), connects to the base of a transistor TR5, the collector of which is connected to the DIRECT_CURRENT-CONTROL_DRIVER terminal as shown in FIG. 5 and described above.

For DC current measurement, the circuit uses a shunt resistor R61. The voltage across the shunt resistor R61 is amplified by a high-speed amplifier IC11-A, the gain being determined by the resistances of resistors R40 and R62. The amplified voltage is directed to the I_AMP terminal via a diode D3, to provide the cycle-by-cycle control signal for the PWM integrated circuit IC1 described above and shown in FIG. 5. This aspect of the current limiting circuit provides the principal active function during the Current Mode Normal mode described above.

If the DC current is sufficiently large (i.e. such that it exceeds a set current limit), the current through resistor R46 generates a voltage high enough to turn on the transistor TR5 so that, via diode D2, a signal is provided at the DIRECT_CURRENT-CONTROL_DRIVER terminal to switch off the MOSFETS TR3 and TR4 with minimal delay, as described above with reference to FIG. 5 (i.e. Current Mode Fast with No Delay).

Conditions of very high current flux change can arise, for example at initialisation of the power supply when internal power supply capacitors are charged from zero volts to the high input voltage. In these conditions, the instantaneous voltage across the MOSFET switches TR3 and TR4, as well as across inductors L2-L5 in the output filter circuit described below, will be at its highest. Also, the pulse provided by the PWM circuit IC1 will be of very short duration, typically less than 1 µs. The shunt circuit described above is unable to reliably detect these very short duration high transient currents. These conditions can also give rise to high noise and a current transformer is independent of any common mode problems associated with the reliable detection of the pulsed current in the amplifier IC-11A. In order to detect these very short duration, high transient current conditions, the current induced in the secondary windings of transformer T1 is directed via a DC restoring and pulse stretching circuit that includes diode D13, capacitor C16 and resistor R39, and through resistor R49 to switch on the transistor TR5 so as to provide a signal at the DIRECT_CURRENT-CONTROL_DRIVER terminal and switch off the MOSFETs TR3 and TR4 (i.e. Current Mode Fast with No Delay as described above for FIG. 5). The current induced in the secondary windings of T1 is also directed, via resistor R3 to the I_AMP terminal, but the main use of the current transformer T1 is for detection of the short duration pulses for protecting against the high transient current conditions.

Figure 7:
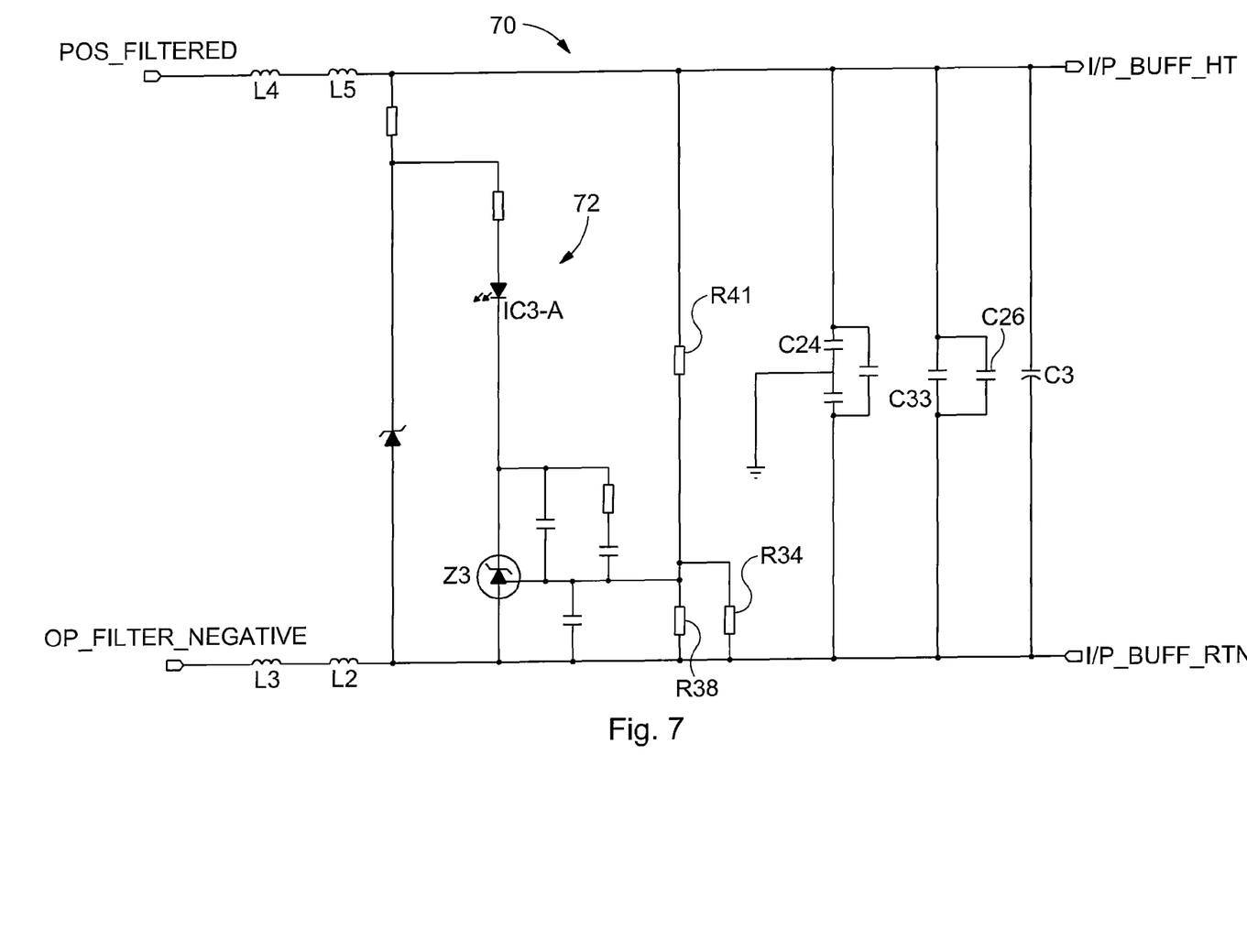
FIG. 7 is circuit diagram of an output filter circuit forming part of the transient differential filter switching regulator of FIG. 3.

FIG. 7 illustrates an output filter circuit 70, which includes the second input filter part 38 of FIG. 3. Inductors L4 and L5 are located in series between the POS_FILTERED terminal and the high voltage output terminal I/P_BUFF_HT, which is used as the positive or high voltage input to the DC-to-DC converter. Inductors L2 and L3 are located in series between the O/P_FILTER_NEGATIVE terminal and the low voltage or return current output terminal I/P_BUFF_RTN. In the circuit shown there are two inductors in series in each of the positive and return lines. There is no particular relevance to the number of inductors in each line. However, because of physical height restrictions it can be advantageous, as in this particular example, to use the circuit-building technique of adding small inductors in series to provide adequate overall inductance.

The output filter circuit also includes capacitors C24, C26 and C33 as well as an electrolytic capacitor C3 across the output terminals. During the Normal Mode On condition, because there is no switching of the MOSFETs, the ripple effect described above for FIGS. 1 and 2 does not arise. However, in this condition the inductors L2-L5 and the capacitors C26, C33 and C3 attenuate the lower frequency EMI spectrum, which may be generated by the switching of loads in the DC-to-DC converter connected to the output terminals or by the transient differential switching regulator itself. During the Current Mode Normal condition, the switching of the MOSFETs TR3 and TR4 by the PWM signal does give rise to the current ripple effect, and in this condition the inductors L2-L5 smooth out these ripples. Note that at start up TR3 and TR4 are switched off, so disconnecting the inductors L2-L5, because there are no auxiliary supplies to enable the logic. This means that if input voltages are applied the input will not see directly any high value capacitance, such as C3 in FIG. 7, and will only start to charge the capacitance C3 under the current control mode as described above.

The output filter circuit 70 also includes an over-voltage detection circuit 72. This circuit includes an amplifier Z3 with an internal reference voltage (typically 1.25 volts) and measures the voltage across the output terminals I/P_BUFF_HT and I/P_BUFF_RTN referenced to a set-point determined by the values of resistors R34, R38 and R41. If the voltage exceeds this over-voltage set-point, the measurement circuit causes a current to flow through a resistor R21 and an opto-coupler diode IC3-A. The opto-coupler diode IC3-A is coupled to the opto-coupler switch IC3-B shown in FIG. 5 to thereby modify the I_AMP signal input on pin 1 of IC1. The resistor R18, which is in series with the opto-coupler switch IC3-B shown in FIG. 5 limits the maximum current demand that IC3 can provide so that the voltage proportional to current signal provided to I_AMP terminal can be satisfied. This alters the PWM signal output on pin 6 of IC1, to change the input to pin 3 of IC4 and then turn off the MOSFETs TR3 and TR4 via the output from pin 4 of IC4. Under normal operating conditions (without an over-voltage) the circuit 72 is passive so that no current flows through IC3-A.

Figure 8:
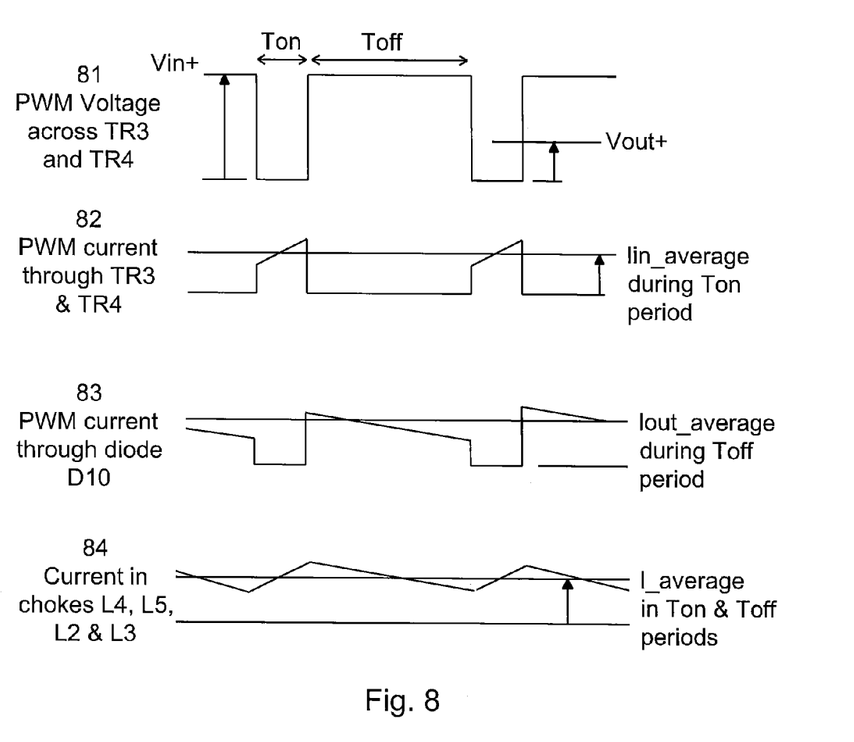
FIG. 8 shows a series of graphs showing cyclical variations of voltage across or current through various components of the transient differential filter switching regulator of FIG. 3.

FIG. 8 shows the time variation of voltages and currents that occur during a train of PWM pulses produced by IC1 (see FIG. 5) in the current mode normal condition.

The first graph 81 shows the voltage waveform across TR3 and TR4 of FIG. 5, which changes from a high voltage Vin+ to a very low voltage Vout+ when the PWM signal is in an On state. The voltage across TR3 and TR4 changes to Vin+ when the PWM signal is in an Off state.

The second graph 82 shows the waveform of the current conducted through TR3 and TR4 when the PWM signal is in an On state for a period Ton and increases in value according to the following:

$$Vin+ = (Inductance \times Change\ in\ current)/Ton\ period$$

or $$Change\ in\ Current\ in\ switch = (Vin+ \times Ton\ period)/Inductance$$

The Inductance is the sum of the inductance values of all the inductors L4, L5, L3 and L2 in FIG. 7. The current in the switches TR3 and TR4 falls to zero when the PWM signal is in an Off state. The second graph 82 also shows the average current Iin_average during the Ton period.

The third graph 83 shows the waveform of the current in the diode D10 shown in FIG. 5, which conducts when the PWM signal is in an Off state for the Toff period and is at zero when the PWM signal is in an On state (the Ton period). The current generated in TR3 and TR4 when the PWM changes from an On state to an Off state is commutated, or switched, into D10 via the inductors L4, L5, L3 and L2, because the current in an inductor is instantaneously maintained. The arrangement of the Diode D10 is known as a freewheeling diode condition. The current in the inductor changes during this period according to:

$$Change\ in\ Freewheeling\ Diode\ Current = (Vout+ \times Toff\ period)/Inductance$$

$$Vout+ = I/P\_BUFF\_HT - I/P\_BUFF\_RTN\ (see\ FIG.\ 7)$$

The fourth graph 84 shows the combined waveform of the current in the chokes or inductors L4, L5, L2 and L3 during the Ton period when the current increases and the freewheeling condition in the Toff period when the current in the inductances reduces.

FIG. 8 illustrates the effect of the Transient Differential Filter Switching Regulator, which allows a high input voltage and Iin_average current during the Vin applied (Ton) period to be translated to the same output Iin continuous current (as shown in the fourth graph 84) but at a very significantly lower operating voltage Vout+ than the applied input voltage Vin+. It should be noted that the average output current is maintained at Iout during continuous periods of high input voltage differential between the input voltage applied to the Transient Differential Filter Switching Regulator and the output voltage.

The above operating topological condition occurs during two situations:—

A) Input Start up when a large input voltage can be applied but there is a low or zero voltage on any Capacitance connected across the output. This Capacitance has to be charged up with an efficient operating circuit and with a limited current control as illustrated. The output current control is the operational function required to be performed by the circuit and allows the circuit to charge up the voltage on any output Capacitance, C3 in FIG. 7 until the input voltage Vin+ is equal to the output voltage Vout+ at which point the PWM circuit ceases to operate and the switches TR3 and TR4 continuously conduct. This differentiates the Transient Differential Filter Switching Regulator from a conventional Switching Regulator which does not have to consider PWM duty ratio operation at 100 percent.

B) Over Voltage input situation Vin+ significantly above the output operational voltage Vout+ which allows the output voltage of the Transient Differential Filter Switching Regulator to control the output voltage to a known maximum allowed voltage level and during this phase of operation also to control the output current.

From the above it can be seen that the transient differential switching regulator 30 of the present invention provides numerous advantages. The use of a current transformer in the current detection circuitry overcomes the problem of detecting high transient currents when using high frequency pulses for PWM control. Differential chokes are used in the transient voltage and current limiting circuitry. These differential chokes have a dual function, acting to smooth the current during the Current Mode and also acting as part of the EMC filtering circuitry during normal operation, and thereby reducing the number of circuit components, particularly the number of large magnetic (inductor) components. Locating the active switches (TR3 and TR4) in the input return, rather than in the high voltage input line, reduces the operational voltage that these components are subjected to.

The invention claimed is:

1. A transient differential switching regulator for a DC power supply, wherein an output of the regulator is provided between a positive voltage line and a return line, the regulator comprising:
a switching circuit for switching the regulator between a normal mode wherein the output voltage is controlled at a set-point voltage, and a current mode wherein the output current is controlled so as not to exceed a peak current limit;
a first inductance disposed in the positive voltage line; and
a second inductance disposed in the return line.

2. The regulator of claim 1 wherein the switching circuit comprises an integrated circuit operable to provide a voltage signal to switch one or more field effect transistors, wherein, in the normal mode the transistors are held on continuously and in the current mode the transistors are switched to control the output current.

3. The regulator of claim 2 configured to operate in the current mode at initialisation of the regulator so that an output capacitance can be charged up to the normal input voltage level.

4. The regulator of claim 1 comprising a pulse-width modulated, PWM, signal generator, whereby in the current mode a pulsed signal is provided for switching the transistors when operating in the current mode.

5. The regulator of claim 4 including a voltage set-point input to the PWM signal generator, wherein the PWM signal generator provides a continuous duty ratio of 100% when the voltage set-point is achieved.

6. The regulator of claim 5 further comprising an over-voltage detection circuit operable to affect the voltage set-point input provided to the PWM signal generator.

7. The regulator of claim 6 wherein the over-voltage detection circuit comprises an opto-coupler diode coupled to an opto-coupler switch.

8. The regulator of claim 2 further comprising a current detection circuit having a terminal for providing a signal to over-ride the voltage signal and switch off the field effect transistors on detection of an over-current.

9. The regulator of claim 8 wherein the current detection circuit is configured to perform dual functions of measuring a DC current so as to protect against an over-current condition arising during the normal operation mode and detecting high transient current conditions.

10. The regulator of claim 9 comprising a current-sensing transformer for detecting a high transient DC current.

11. The regulator of claim 9 comprising a shunt resistor for detecting an over-current condition arising during the normal operation mode.

12. The regulator of claim 11 comprising an amplifier for amplifying the voltage across the shunt resistor and providing the amplified voltage signal as an input to a PWM generator to provide a pulse-width cycle-by-cycle control signal for the current mode.

13. The regulator of claim 8 wherein the switching circuit and the current detection circuit are provided in a low-voltage return line from the power supply.

14. The regulator of claim 1 wherein an unregulated DC input is provided to the regulator and the output is a regulated DC output.

15. The regulator of claim 14 wherein the current detecting circuit comprises a current-sensing transformer for detecting high, very short duration transient current conditions, and a shunt resistor for measuring the DC current so as to protect against an over-current condition arising during the normal operation mode in which the PWM signal generator provides a continuous duty ratio of 100%.

16. The regulator of claim 14 further comprising an amplifier for amplifying a voltage measured across the shunt resistor and providing the amplified voltage signal as an input to the PWM generator to provide a pulse-width cycle-by-cycle control signal for the current mode.

17. The regulator of claim 14 wherein the current-sensing transformer is configured to detect high transient currents of a duration of less than 1 µs.

18. A transient differential switching regulator for a DC power supply, comprising:
a switching circuit for switching the regulator between a normal mode wherein the output voltage is controlled at a set-point voltage, and a current mode wherein the output current is controlled so as not to exceed a peak current limit; and
a current detecting circuit configured to perform dual functions of measuring a DC current so as to protect against an over-current condition arising during the normal operation mode and detecting high transient current conditions.

19. The regulator of claim 18 comprising a current-sensing transformer for detecting a high transient DC current.

20. The regulator of claim 18 wherein the current detecting circuit is disposed in a low voltage return line of the regulator.

21. The regulator of claim 18 wherein an unregulated DC input is provided to the regulator and a regulated DC output is provided from the regulator.

22. The regulator of claim 18 wherein the switching circuit comprises transistors, the regulator further comprising a PWM signal generator for generating a pulsed signal for switching the transistors in the switching circuit, the PWM signal generator providing a continuous duty ratio of 100% when the voltage set-point is achieved.

* * * * *